April 6, 1954
H. A. DE CENZO
2,674,421
JET-DRIVEN ROTARY WING ARRANGEMENT FOR JET
PROPELLED CONVERTIBLE AIRCRAFT
Filed Sept. 25, 1948
2 Sheets-Sheet 1
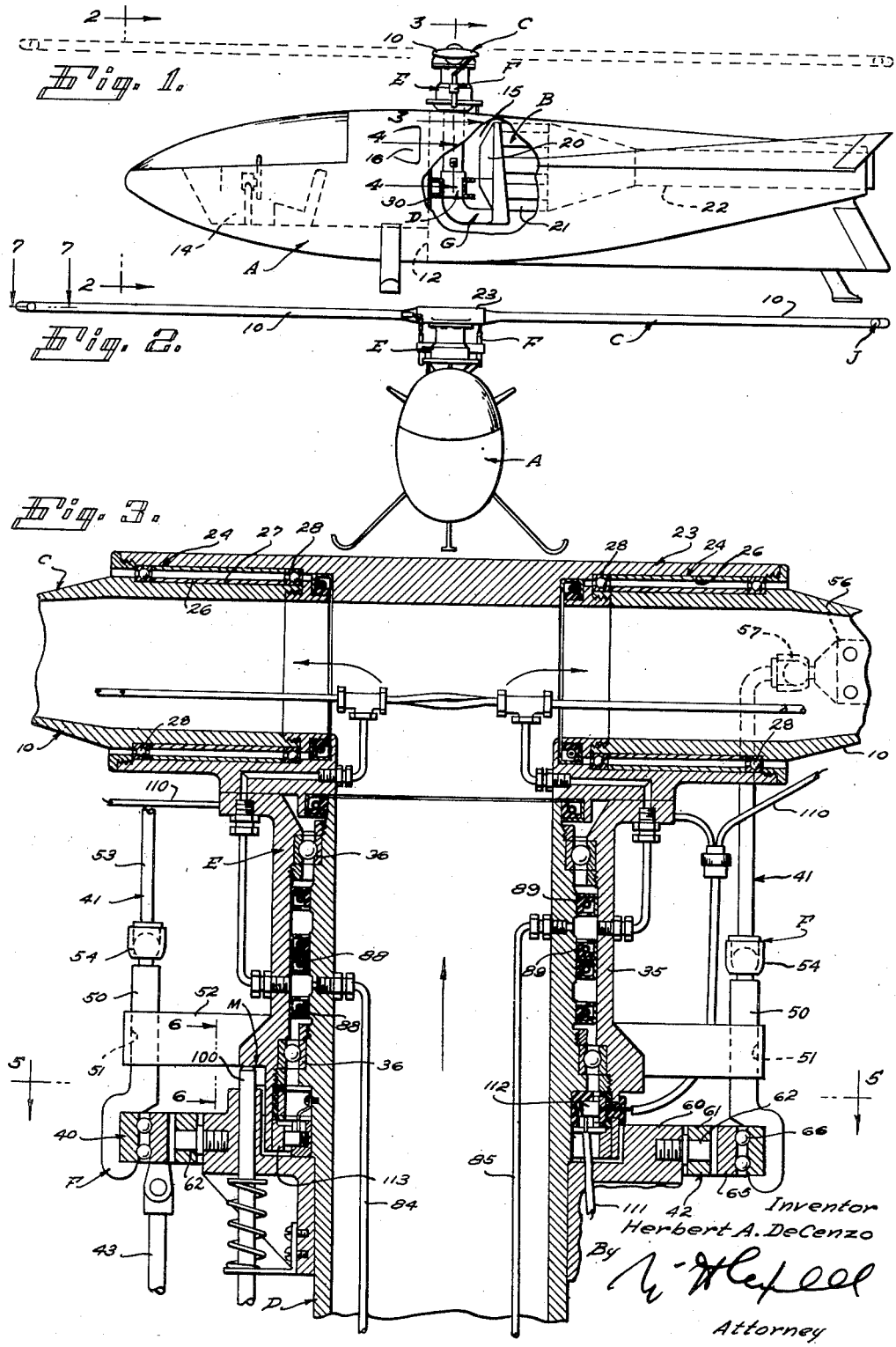
Inventor
Herbert A. DeCenzo
Attorney

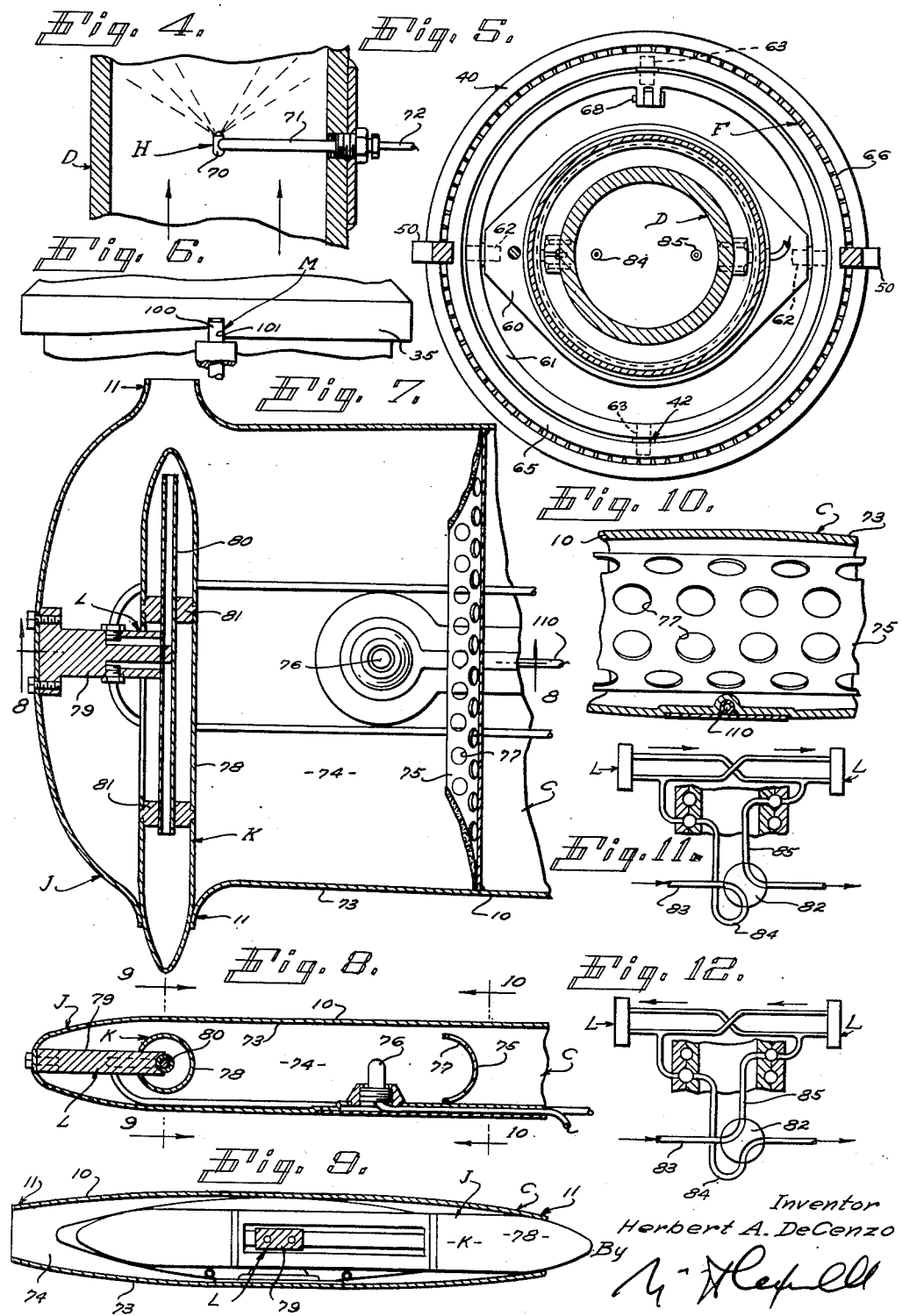

Patented Apr. 6, 1954

2,674,421

UNITED STATES PATENT OFFICE 2,674,421

JET-DRIVEN ROTARY WING ARRANGEMENT FOR JET PROPELLED CONVERTIBLE AIRCRAFT

Herbert A. De Cenzo, Arcadia, Calif.

Application September 25, 1948, Serial No. 51,201

17 Claims. (Cl. 244—7)

This invention has to do with a jet propelled aircraft, it being a general object of the invention to provide an improved simplified and effective construction by which a craft is advantageously propelled through the air through jet action.

It is a general object of this invention to provide a jet propelled aircraft wherein there is a rotor combined with a body or fuselage and jet action is employed to drive or thrust the body forward and also to rotate the rotor.

A further object of the invention is to provide an aircraft of the general character referred to wherein jet units are applied to or incorporated in connection with the blades of the rotor and are such that the rotor can be effectively operated in either direction. With the construction of the present invention the rotor can be operated in a manner to effectively lift the craft and when it is desired to stop rotation of the rotor the jet units in connection therewith may be reversed, causing the rotor to rapidly come to a position of rest or even to rotate in the opposite direction if so desired.

It is another object of the present invention to provide an aircraft of the general character referred to wherein the rotor which is subject to being operated to cause lift may be set in a stationary position relative to the fuselage in such manner as to, in effect, form a wing serving to stabilize and act in the manner that a wing normally acts in heavier than air craft.

Another object of the present invention is to provide various features of construction in such a structure of the general character referred to by which the working parts are effectively mounted and coupled and are under control, making the structure safe and simple to operate.

The various objects and features of my invention will be fully understood from the following detailed description of a typical preferred form and application of the invention, throughout which description reference is made to the accompanying drawings, in which:

Fig. 1 is a side elevation of an aircraft embodying the present invention, certain parts being broken away to show the internal construction and the rotor being shown in position where it forms a wing, another position of the rotor being indicated in dotted lines. Fig. 2 is a front elevation of the structure, being a view taken in the direction indicated by line 2—2 on Fig. 1. Fig. 3 is an enlarged detailed vertical sectional view taken as indicated by line 3—3 on Fig. 1. Fig. 4 is an enlarged vertical section view taken as indicated by line 4—4 on Fig. 1. Fig. 5 is a reduced plan section taken in the direction indicated by line 5—5 on Fig. 3. Fig. 6 is a reduced side elevation of a portion of the structure, being a view taken as indicated by line 6—6 on Fig. 3. Fig. 7 is an enlarged plan section of a portion of the rotor, being a view taken as indicated by line 7—7 on Fig. 2. Fig. 8 is a sectional view taken as indicated by line 8—8 on Fig. 7. Fig. 9 is a sectional view taken as indicated by line 9—9 on Fig. 8. Fig. 10 is a sectional view taken as indicated by line 10—10 on Fig. 8. Figs. 11 and 12 are diagrammatic views illustrating the operating system provided for actuating the controls for the jet units provided in connection with the blades of the rotor.

The structure embodying the present invention includes, generally, a body or fuselage A, a main jet propulsion unit B carried by and located in the fuselage A, a rotor C at the exterior of the fuselage, a vertical support D projecting from the fuselage, mounting means E rotatably supporting the rotor C on the support D, a pitch control F for the blades of the rotor, a manifold G conducting air under compression from the jet unit B to the support D which is tubular in form, fuel supply means H introducing fuel into the air handled by the manifold G and support D to establish a combustible mixture handled by the tubular blades 10 of the rotor, jet units J in connection with the blades 10 of the rotor each characterized by discharge jets 11 at opposite edges of the blades, control means K for the jets of the units J operating means L for the control means K and various other elements and features of construction as will appear from the drawings and from the following detailed description.

The fuselage A may, as I have shown in the drawings, be of the general form common to aircraft of the heavier than air type, and in practice its specific form and details of construction may be varied widely, as desired. In the particular case illustrated the fuselage is shown with a vertical partition 12 dividing it into a forward compartment 14 which may accommodate the operator, passengers, cargo, etc. and a rear compartment 15 which accommodates various working elements of the structure, mainly the propulsion unit B, the support D carrying the rotor, and like elements. A plurality of suitable air inlet openings 16 are provided in the fuselage serving to admit air into the rear compartment 15 where it is handled or consumed by the unit B.

The jet propulsion unit B is shown mounted in the rear compartment 15 of the fuselage and for purpose of illustration I have indicated a simple, typical jet propulsion unit characterized by a turbine driven compressor 20, a plurality of rearwardly extending combustion chambers 21 and a jet tube 22 extending rearwardly through the fuselage and discharging at the rear ends thereof.

The rotor C provided by the present invention involves two blades 10 carried by a central hub 23. In accordance with the present invention bearing means 24 rotatably couples the blades and hub so that each blade is tiltable or rotatable about an axis transverse of the axis of rotation of the rotor. In the particular case illustrated the hub 23 is shown provided with oppositely opening sockets 26 receiving base portions 27 of the blades. The means 24 are shown as involving antifriction bearings 28 rotatably supporting the base portions 27 in the sockets 26.

In accordance with the present invention each blade 10 is an elongate flat tubular element serving to conduct a combustible mixture to the unit J provided in connection with the blade and the cross sectional configuration of the blade is made such as to give it the desired wing action when the blade is held in fixed position transverse of the fuselage, as shown in Figs. 1 and 2 of the drawings. It is to be understood, of course, that the blades may be of any suitable construction and that they may be varied in size, proportioning, design, etc. in accordance with the results desired.

The support D is carried by the fuselage as for instance by suitable frame members 30, so that it extends vertically and projects to the exterior of the fuselage. In the particular case illustrated the support projects above the fuselage and, consequently, the rotor C carried by the support is rotated above the fuselage. In accordance with the present invention the support D is a tubular element having its lower end in communication with the manifold G while its upper end opens into the hub 23 which, in turn, is in communication with the interiors of the blades 10.

The manifold G couples the jet unit B with the support D and serves to take part of the compressed air delivered by the compressor 20 of the unit B and deliver it to the lower end of the support D with the result that there is a flow of air under pressure upwardly through the support D.

The mounting means E supporting the rotor C on the support D is shown as including a sleeve 35 joined to and depending from the hub 23 of the rotor to extend over the upper end portion of the tubular support D, and anti-friction means or bearings 36 rotatably supporting the sleeve on the tubular support. In the case illustrated there are two anti-friction bearings spaced a substantial distance apart, with the result that the sleeve is effectively supported for free rotation on the support D.

The pitch control F provides a means by which the operator of the craft may vary the rotative position of the blades relative to the hub or to cause working or rocking of the blades relative to the hub as the rotor operates. In the particular case illustrated the pitch control is shown as including, generally, an operating ring 40 surrounding the support, links 41 coupling the ring 40 with the blades, a universal coupling 42 between the support D and the ring 40, and operating rods 43 joined to the coupling 42 and extending in any suitable manner to a point where they are convenient for operation, as for example, to the position of the operator in the craft in the manner common to controls of this general character.

The ring 40 is of substantial diameter and surrounds the support D with clearance sufficient to accommodate the coupling 42. The links 41 that connect the ring 40 with the blades 10 of the rotor involve lower sections 50 coupled to diametrically opposite parts of the ring 40 and slidably carried in openings 51 in guide brackets 52 projecting from the sleeve 35. Upper sections 53 of the links are connected to the lower sections by universal joints 54 and with brackets 56 on the blades by universal joints 57, with the result that as the parts of the ring 40 to which the link portions 50 are connected are moved up or down, the blades are correspondingly rotated in the hub sockets 26.

The universal coupling 42 involves a flange 60 projecting from the support D, an annular rocker 61 between the flange 60 and the ring 40, and a collar 65 surrounding the rocker. Diametrically opposite trunnions 62 pivotally mount the rocker 61 on the flange 60 and diametrically opposite trunnions 63 pivotally mount the collar 65 on the rocker 61. The trunnions 62 are on an axis located 90° from the axis of the trunnions 63. Anti-friction bearing members 66 rotatably support the ring 40 on the collar 65 so that the ring 40 is free to be carried around with the rotor.

In the preferred arrangement there are two operators 43 for the universal coupling 42. The operators 43 may be coupled to the working parts of the coupling 42 to gain the desired setting or positioning of the coupling. In the case illustrated one coupling member 43 is shown coupled to the collar 65 from which it may extend to any desired point in the aircraft, while the other operator is shown coupled to the rocker at 68. The couplers connect to the coupling 42 at points 90° apart around the axis of the structure, as will be apparent from the drawings. The fuel supply means H serves to introduce suitable fuel as for instance, liquid fuel, into the stream of compressed air being handled by the structure above described. In the case illustrated the means H involves a spray nozzle 70 carried by a supply arm 71 which extends into the tubular support D to support the nozzle 70 centrally in the support. A suitable supply line 72 supplied with the desired fuel under pressure communicates with the arm 71 to deliver the fuel thereto.

The propulsion units J provided in connection with the blades 10 of the rotor C may be of any desired form or type and may be located in various positions on or lengthwise of the blades. In the case illustrated the units J are located at the outer ends or tip portions of the blades and they are alike.

Each unit J involves an extension 73 of the blade that forms a combustion chamber 74 and which carries or has nozzle or jet portions 11 at opposite edges so that they open at the two edges of the blade. A suitable baffle 75 separates the combustion chamber 74 from the interior of the blade and igniter 76 such as an electrical unit is located in the combustion chamber to ignite the charge that enters it through the perforations 77 in the baffle 75.

The control K for the unit J just described serves to normally close one or the other of the nozzles 11 and in the preferred form of the invention it involves a single plug-type valve member 78 mounted to reciprocate between the nozzles 11 and having tapered end portions which seal in the nozzles to close them off, as shown in Fig. 7 of the drawings. The mounting shown for the valve member 78 involves a bracket 79 carrying a stem 80 slidably supporting heads 81 provided in the valve member 78. The end portions of the valve member 78 outward of the heads 81 are closed, as shown in Fig. 7 of the drawings.

The operating means L for the control K may be a fluid pressure means, for instance, as shown in the drawings it may involve a control valve 82 receiving fluid under pressure from a supply line 83 and handling it through lines 84 and 85 so that it is admitted to and exhausted from the end portions of the valve element 78, as desired. The valve 82, as shown in Figs. 11 and 12, is reversible or such as to admit fluid under pressure to either of the lines. In the preferred form of the invention the valve 82 is located in fixed position and the lines extend from the valve to the moving rotor C through connections between the support D and the sleeve 35 of the mounting means E. The fixed or stationary section of line 84 is connected with the movable section carried by or with the rotor through spaced packers 88 occurring between the support D and the sleeve 35. The fixed or stationary section of line 85 is connected with the moving or rotating portion thereof through spaced packers 89 between the support D and sleeve 35. From Fig. 3 of the drawings it will be apparent how the sections of the lines 84 and 85 carried by the rotor C may be handled within the hub 23, and through the blades 10, so that fluid under pressure is supplied to and exhausted from the tip portions of the blades where the valve members 78 are located.

In the particular arrangement illustrated the lines 84 and 85 of the operating means are connected to opposite end portions of each stem 80 through the brackets 79 so that when fluid under pressure is supplied to one line it is exhausted through the other, with the result that each valve 78 will operate in one direction or the other, depending upon the setting of valve 82. To gain lift or for normal operation of the rotor the valves 78 in connection with the blades 10 will close the jets 70 at the leading edges of the blades, whereas, when it is desired to check rotation of the rotor or to reverse it the structure just described is operated so that the valve elements are moved to close the jets 11 at the trailing edges of the blades.

In the preferred form of the invention a stop means M is provided in connection with the rotor C that may be engaged to stop the rotor with the blades transverse of the fuselage, in the event that the jet units J are operated so they tend to rotate the rotor in the reverse direction. The particular means M illustrated in the drawings is a simple ratchet-like stop involving a stop finger 100 carried by the flange 60 projecting from the support D and cooperating with a stop shoulder 101 on the sleeve 35. The parts just described are preferably shaped and proportioned as shown in Fig. 6, so that upon the finger 100 being operated or moved up toward the sleeve 35 it engages the shoulder 101 upon the rotor reaching a position where the blades are transverse of the fuselage.

When the invention involves electrical igniters 76 in the jet units J suitable electrical connections may be established to the igniters through lead lines 110 coupled with a line 111 from a fixed source of electrical energy through brushes 112 carried by the support 10 and cooperating with commutator rings 113 supported by sleeve 35.

From the foregoing description it will be apparent how through my present invention the structure may be propelled forward by suitable operation of the jet unit B or may be elevated through suitable operation of the rotor C or both, as the operator desires. It will be apparent how suitable controls may be incorporated in the craft so that the jet units B and J may be operated simultaneously or independently, as circumstances require. Further, it will be apparent that through suitable control of the rotors C the desired lift or elevation of the craft can be gained and, if desired, the rotor may be set with the blades transverse of the fuselage, in which case they have a desirable wing action at a time when the craft is being propelled forward by the jet unit B.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. An aircraft of the character described including, a fuselage, a rotor mounted at the exterior of the fuselage and having projecting blades, a jet propelling unit in the fuselage and including a compressor and a jet tube discharging rearwardly of the fuselage, jet units operating the rotor and supplied by the said compressor, each of the last mentioned units having discharge jets at opposite edges of a blade, and a single plug type valve in each blade controlling flow from said discharge jets so one jet of each blade is closed when the other is open.

2. An aircraft of the character described including, a fuselage, a rotor mounted at the exterior of the fuselage and having projecting blades, a jet propelling unit in the fuselage and including a compressor and a jet tube discharging rearwardly of the fuselage, jet units operating the rotor and supplied by the said compressor, each of the last mentioned units having discharge jets at opposite edges of a blade, a single control member controlling flow from said discharge jets so one is closed when the other is open, and fluid pressure actuated means operating the control member to selectively close said discharge jets.

3. An aircraft of the character described including, a fuselage, a jet propelling unit in the fuselage and having a compressor and a jet tube discharging rearwardly of the fuselage, a vertically disposed tubular support carried by the fuselage, a manifold receiving compressed air from the compressor and delivering it into the lower end of the support, a rotor mounted on the support to operate above the fuselage and including a hub on the support and hollow blades rotatably carried by the hub, jet units carried by the blades propelling the rotor and supplied with air through the support and blades, tilting means controlling the pitch of the blades, the said jet units each having jet openings at opposite edges of a blade, and a single member operating to close either jet opening of each of said jet units when the other jet opening thereof is open.

4. An aircraft of the character described including, a fuselage, a jet propelling unit in the fuselage and having a compressor and a jet tube discharging rearwardly of the fuselage, a vertically disposed tubular support carried by the fuselage, a manifold receiving compressed air from the compressor and delivering it into the lower end of the support, a rotor mounted on the support to operate above the fuselage and including a hub on the support and hollow blades rotatably carried by the hub, jet units carried by the blades propelling the rotor and supplied with air through the support and blades, tilting means controlling the pitch of the blades, the said jet units each having jet openings at opposite edges of a blade, a single valve operating to close one jet opening of each of said jet units when the other jet opening thereof is open, and fluid pressure operating means operating the control means.

5. An aircraft of the character described including, a fuselage, a jet propelling unit in the fuselage and having a compressor and a jet tube discharging rearwardly of the fuselage, a vertically disposed tubular support carried by the fuselage, a manifold receiving compressed air from the compressor and delivering it into the lower end of the support, a rotor mounted on the support to operate above the fuselage and including a hub on the support and hollow blades rotatably carried by the hub, jet units carried by the blades propelling the rotor and supplied with air through the support and blades, tilting means controlling the pitch of the blades, the said jet units each having jet openings at opposite edges of a blade, a single reciprocating control valve operating to close one jet opening of each of said jet units when the other jet opening thereof is open, fluid pressure operating means operating the control means, and stop means acting to stop the rotor with its blades transverse of the fuselage.

6. An aircraft of the character described including, an elongate fuselage, a rotor mounted at the exterior of the fuselage on an axis normal to that of the fuselage and having radially projecting blades, a jet propelling unit in the fuselage and including a jet tube substantially parallel with and discharging rearwardly of the fuselage, and jet units carried by the outer end portions of the blades and operating the rotor, each of the jet units having two outlet openings and a single control valve whereby said openings are selectively employed.

7. An aircraft of the character described including, an elongate fuselage, a rotor mounted at the exterior of the fuselage on an axis normal to the longitudinal axis of the fuselage and having radially projecting blades, a jet propelling unit in the fuselage and including a jet tube substantially parallel with and discharging rearwardly of the fuselage, and jet units carried by the outer end portions of the blades and operating the rotor, each of the jet units having two oppositely disposed jet openings and a single shiftable control element selectively closing one of the openings at a time, and means supplying fuel and air through the blades and to the jet units carried thereby.

8. A rotor for aircraft of the character described, including, a rotatably supported unit having radially projecting blades, a jet unit carried by each of the blades and each jet unit having a front and rear outlet and a single reciprocating selective control element for the outlets closing one when the other is open.

9. A rotor for aircraft of the character described, including, a rotor with radially projecting blades, means rotatably supporting the rotor, jets carried by the blades and each having outlets faced in different directions from its supporting blade and a member selectively closing the outlets, and a control for said member by which it is operated between positions closing the outlets and operating through the said means.

10. A rotor for aircraft of the character described including, a rotor with radially projecting blades, means rotatably supporting the rotor, jets carried by the blades and each having outlets faced in different directions from the blade and a member having operating positions selectively closing the outlets, and a fluid pressure actuated control operating said member between said positions and energized by fluid supplied through the said means.

11. An aircraft rotor blade having a tip with leading and trailing edges each having a jet delivering opening, and a closure shiftable relative to the blade between positions where it selectively closes the openings.

12. An aircraft rotor blade having a tip with leading and trailing edges each having a jet opening, there being a chamber in the blade between the openings, a closure member shiftable in the chamber between positions where it selectively closes the openings, and fluid pressure actuated means adapted to operate the closure member between said positions.

13. An aircraft rotor blade having a tip with leading and trailing edges each having a jet opening, there being a chamber in the blade between the openings, a closure member shiftable in the chamber between positions where it selectively closes the openings, and means adapted to operate the closure between said positions, the blade having a passage therethrough passing air to the chamber.

14. An aircraft rotor blade having a tip with a combustion chamber therein having leading and trailing portions each having a jet opening, and a closure member operating in the chamber to selectively close the openings, the blade having a passage therethrough passing air to the tip and having a fire baffle between the passage and chamber.

15. In a structure of the character described, a rotor having a blade with a passage therethrough, means mounting the rotor on a fixed axis including a tubular supporting column, reversible jets carried by the blade and operating the rotor, and a single shiftable member with elements at the jets operating to reverse them and supplied with energy for operation through the column, the jets being supplied with air and fuel through the support and the passage of the blade.

16. In a structure of the character described, a rotor having a blade with a passage therethrough, means mounting the rotor on a fixed axis including a tubular supporting column, reversible jets carried by the blade and operating the rotor, ignition means for the jets energized through the column, and a single reciprocating control valve with elements at the jets operating to reverse them and supplied with energy through the column, the jets being supplied with air and fuel through the support and the passage of the blade.

17. In a structure of the character described, a rotor having a blade with oppositely disposed leading and trailing edges, means mounting the rotor on a fixed axis including a supporting column, reversible jets carried at the leading and trailing edges and operating the rotor, a single reciprocating control valve with elements operable between the jets to open the jets separately, and operating means adapted to shift the valve element and supplied with energy through the column, the column and blade passing fuel and air to the jets.

References Cited in the file of this patent

UNITED STATES PATENTS

| Number | Name | Date |
|---|---|---|
| 1,003,708 | Coleman | Sept. 19, 1911 |
| 1,546,313 | Pescara | July 14, 1925 |
| 2,001,529 | Dornier | May 14, 1935 |
| 2,142,601 | Bleecker | Jan. 3, 1939 |
| 2,385,366 | Lysholm | Sept. 25, 1945 |
| 2,396,130 | Sbrilli | Mar. 5, 1946 |
| 2,397,357 | Kundig | Mar. 26, 1946 |
| 2,411,227 | Planiol | Nov. 19, 1946 |
| 2,429,646 | Pullin | Oct. 28, 1947 |
| 2,435,836 | Johnson | Feb. 10, 1948 |
| 2,438,151 | Davis | Mar. 23, 1948 |
| 2,477,637 | Mercier | Aug. 2, 1949 |
| 2,514,749 | Dobbins | July 11, 1950 |
| 2,544,497 | Herrick | Mar. 6, 1951 |

FOREIGN PATENTS

| Number | Country | Date |
|---|---|---|
| 544,834 | Germany | Feb. 29, 1932 |
| 556,866 | Great Britain | Oct. 26, 1943 |
| 648,107 | France | Aug. 7, 1928 |
| 931,296 | France | Oct. 6, 1947 |